United States Patent [19]

Baba et al.

[11] 3,750,020

[45] July 31, 1973

[54] RADIO COMMUNICATION TRANSMISSION SYSTEM FOR VEHICLES

[76] Inventors: Takeshi Baba, 27, Inaridai, Itavashi-ku, Tokyo; Kenji Shibuya, 1-1, Taisei-cho, Ohmiya City; Masaaki Sasada, 406, 45 Goto, 30 Ryodo-cho, Nishinomiya City; Mikio Nakagawa, 1-23, Umeki-cho, Itami City; Taichiro Nagao, 76-5, 3-chome, Higashisonoda-cho, Anagasaki City, all of Japan

[22] Filed: July 12, 1971

[21] Appl. No.: 161,439

Related U.S. Application Data

[63] Continuation-in-part of Ser. No. 752,605, Aug. 14, 1968, abandoned.

[30] Foreign Application Priority Data

Aug. 17, 1967 Japan .................... 42/53051

[52] U.S. Cl. .......................... 325/5, 325/9, 325/51

[51] Int. Cl. .......................................... H04b 7/20

[58] Field of Search ...................... 325/1, 3, 9, 51, 325/53, 55, 62, 5, 11, 52, 54

[56] References Cited

UNITED STATES PATENTS 2,509,218 5/1950 Deloraine ......................... 325/3 X 3,278,850 10/1966 Tomizawa ......................... 325/52 X

*Primary Examiner*—Robert L. Griffin

*Assistant Examiner*—William S. Moore

*Attorney*—William D. Carothers, Floyd B. Carothers et al.

[57] ABSTRACT

A radio communication transmission system for moving vehicles following a track wherein an intermediate frequency communication signal is transmitted on a leaky coaxial cable at a low loss from a ground station. This signal is periodically amplified, if required, to compensate for attenuation, and is also periodically frequency converted into a radio frequency signal which is transmitted along with the aforesaid intermediate frequency signal on the same leaky coaxial cable for uniform leakage therealong for coupling to an antenna on a vehicle traveling adjacent the leaky coaxial cable. A transmitter is proivded on the moving vehicle and transmits a second radio frequency signal from the vehicle to couple the signal to the leaky coaxial cable for transmission thereon. This second radio frequency signal is then frequency converted to a second intermediate frequency signal for transmission at a low loss thereafter on the same leaky coaxial cable to a ground station for reception.

3 Claims, 12 Drawing Figures

INVENTORS.
TAKESHI BABA,
KENJI SHIBUYA &
TAICHIRO NAGAO
BY
CAROTHERS & CAROTHERS
THEIR ATTORNEYS

INVENTORS.
TAKESHI BABA,
KENJI SHIBUYA &
TAICHIRO NAGAO
BY
CAROTHERS & CAROTHERS
THEIR ATTORNEYS

RADIO COMMUNICATION TRANSMISSION SYSTEM FOR VEHICLES

CROSS-REFERENCE

This application is a continuation-in-part of our application Ser. No. 752,605, filed Aug. 14, 1968, now abandoned.

BACKGROUND OF THE INVENTION

1. Field of Invention

The present invention relates to a radio communication system for moving vehicles.

2. Description of the Prior Art

Heretofore, at a tunnel or other zone which can not be penetrated by electric waves, a system has been employed in which arriving space wave signals are received by a ground antenna at the entrance to the tunnel or zone and these signals are led into the tunnel by an open type transmission line for coupling with an antenna aboard a train. If the tunnel is a long distance, boosters are inserted periodically in the line to compensate for attentuation in the transmission line.

FIG. 1 shows an example of such a system heretofore in use. In the figure, 1 denotes an ordinary coaxial cable which does not produce induction fields and radiation fields on the outside of the coaxial outer conductor. Reference numeral 2 denotes two parallel lines which produce induction fields or radiation fields. Reference 3 indicates a booster and 4 a ground antenna.

In FIG. 1, the boosters are connected with each other by coaxial cable 1 and each booster directly amplifies the signal. Part of the signal thus amplified is sent on to the next booster via the coaxial cable 1, while another portion of the signal creates induction fields or radiation fields in the space about the two parallel lines 2 which couples with the train antenna for reception by the receiving unit aboard the train.

When signals are sent from the train, the signals are received by the receiving unit on the ground via a transmission path just the reverse to the above-mentioned.

This system has heretofore been found to have the following shortcomings:

1. As the booster is of a direct amplification type, the gain or degree of boosting is small, so that the output of the booster is limited and it is impossible to make the booster interval long. This makes maintenance of the system more difficult.

2. The transmission line consists of two types of lines, namely, a coaxial cable and two parallel lines, rather than one, so that it is not economical.

3. The two parallel lines increase attenuation when they have rain or dirt sticking to them, so that the attenuation level fluctuates markedly depending on the environmental conditions.

FIGS. *2a* and *2b* are diagrammatic illustrations of the radio communication transmission system for moving vehicles according to the present invention.

FIGS. *3a* and *3b* are diagrammatic illustrations of an example of the construction of an actual transmission line embodying the system of the present invention.

FIGS. *4a*, *4b*, *4c*, *4d* and *4e* are perspective views showing leaky coaxial cables usable in the system of the present invention.

Figures 5, 6:
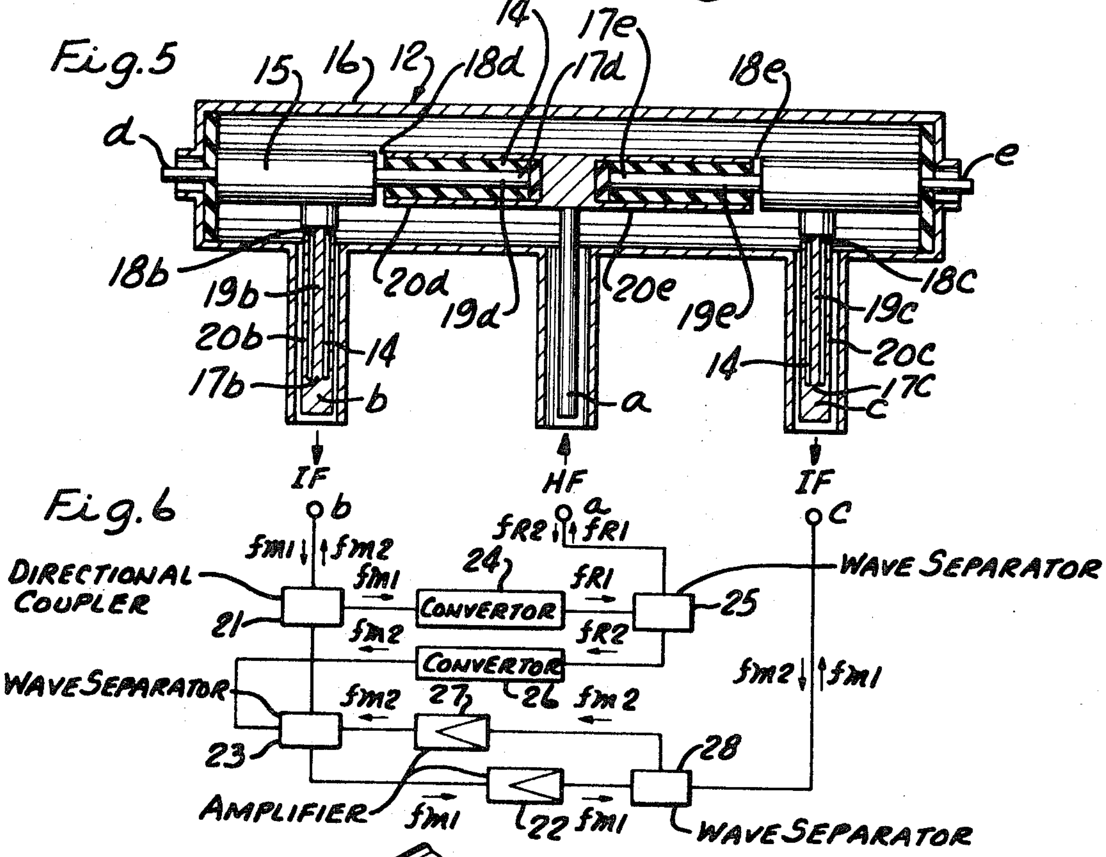
Figure 4E:
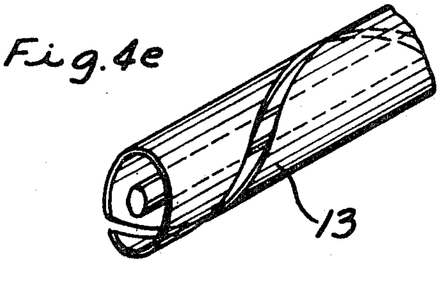

FIG. 5 is a sectional view in elevation showing an example of an intermediate frequency — high frequency (IF·RF) filter used in the present invention.

FIG. 6 is a diagrammatic block diagram of a booster illustrated in FIGS. *2a* and *3a*.

DESCRIPTION OF PREFERRED EMBODIMENTS

The present invention provides an improved radio transmission for moving vehicles (railroad trains, for example), which is free from such disadvantages as mentioned in regard to FIG. 1 and which furthermore has various auxiliary advantages as hereinafter mentioned.

Moreover, it is a system which can be used for radio transmissions to and from moving vehicles inside and/or outside of a tunnel.

The invention will now be explained, with reference to the appended drawings.

In FIG. *2a*, 11 denotes a booster, 12 an intermediate frequency — high frequency (IF·RF) filter device, and 13 a leaky coaxial cable. Heretofore, the frequency for transmission between boosters and the frequency for coupling with the train antenna have been the same, and the former and the latter have been transmitted on different transmission lines (the former using a coaxial cable and the latter two parallel lines). According to the present invention, however, the frequency for the transmission between boosters and the frequency for coupling with the train antenna are different and both the former and the latter are transmitted by one and the same transmission line — a leaky coaxial cable 13.

The booster 11 is not a repeater of the direct amplification type but is a repeater of the frequency conversion type which makes frequency conversion of intermediate frequencies to radio frequencies (for example, several hundreds of megacycles). This frequency conversion type of repeater is advantageous as "singing" due to amplification is eliminated.

The IF·RF filter device 12 is connected to the booster 11 and the leaky coaxial cable 13. Mixing the intermediate frequency signal and high frequency signal from the booster, the filter sends them on to one and the same leaky coaxial cable 13, and conversely it separates an incoming intermediate frequency signal and the incoming high frequency signal from the leaky coaxial cable 13 from each other and leads them to the booster 11. FIG. *2b* shows the IF·RF filter device 12.

With reference to FIG. *2a* and *2b*, the operation of sending signals from a ground station and receiving it on a train according to the present invention is explained. The signal sent from the ground station is transmitted on leaky coaxial cable 13 in the direction indicated by the solid arrow pointing to the right in the figure. In this case, a first intermediate frequency signal $fm_1$ and a first high frequency signal $fR_1$ are transmitted through the leaky coaxial cable. The end (*d*) of the leaky coaxial cable 13 is connected to the IF·RF filter 12, where the first high frequency signal $fR_1$ enters the terminal-*f* and is absorbed by the non-reflective terminal load, while the first intermediate frequency signal $fm_1$ enters the terminal-*b* and becomes the input signal of the booster 11.

At the booster 11, a portion of the input first intermediate frequency signal $fm_1$ from the terminal-*b* is frequency-converted into the first high frequency signal $fR_1$ and is sent out to the terminal-*a*, while a portion is amplified as the first intermediate frequency signal $fm_1$ and sent out to the terminal-*c*. The first high frequency signal $fR_1$ from the terminal-*a* and the first intermediate frequency signal $fm_1$ from the terminal-*c* are mixed by the IF·RF filter 12, and both signals are fed to the next section of leaky coaxial cable 13 from the terminal-*e*. The first high frequency signal $fR_1$ is transmitted through the leaky coaxial cable while radiating, and this radiated signal is received by the train antenna for the receiver aboard the train traveling adjacent this particular section of cable 13. The first intermediate frequency signal $fm_1$ is transmitted through the leaky coaxial cable almost without any radiation (very low loss) and is sent on to the next booster. The same procedure is repeated at each filter-booster.

When a signal is sent from a train and is to be received at a ground station, the operation described above is reversed. Suppose that the signal sent from aboard the train comes in the direction of the dotted arrow in the Figure. In this case, the signal sent from the train is a second high frequency signal $fR_2$. The second high frequency signal $fR_2$ radiated from the train antenna is directed to the leaky coaxial cable 13 and enters the terminal-*e* of the IF·RF filter 12. The second high frequency signal $fR_2$ from the terminal-*e* is fed to the terminal-*a* and becomes the input high frequency signal of the booster 11. At the booster 11, the input second high frequency signal $fR_2$ from the terminal-*a* is frequency-converted into the second intermediate frequency signal $fm_2$ and this second intermediate frequency signal is sent toward the preceding booster (to the left in the figure) from the terminal-*b* via the terminal-*d* of the IF·RF filter and the leaky coaxial cable 13.

The second intermediate frequency signal $fm_2$ from the next booster (from the right in the figure) enters the terminal-*c* of the booster, is amplified if necessary as the intermediate frequency signal, and sent out from the terminal-*b*.

The actual circuitry of the booster 11 shown in FIG. 2 and FIG. 3 is illustrated in block form in FIG. 6.

Referring to FIG. 6, directional coupler 21 removes a portion of the electric power of the first intermediate frequency signal $fm_1$. Amplifier 22 is for the first intermediate frequency signal $fm_1$ and wave separator 23 separates the first intermediate frequency signal $fm_1$ and the second intermediate frequency signal $fm_2$. Converter 24 is the device for converting the first intermediate frequency signal $fm_1$ into the first high frequency signal $fR_1$ and amplifying it. Wave separator 25 separates the first high frequency signal $fR_1$ and the second high frequency signal $fR_2$ and converter 26 converts the second high frequency signal $fR_2$ into the second intermediate frequency signal $fm_2$ and amplifies it. Amplifier 27 amplifies the second intermediate frequency signal $fm_2$, and wave separator 28 separates $fm_1$ and $fm_2$.

In FIG. 6, the first intermediate frequency wave $fm_1$, which has entered the terminal-*b*, goes through the directional coupler 21 and has a section of its energy applied to the frequency converting amplifier 24, where it is converted into the first high frequency signal $fR_1$ and is sent out to the terminal-*a* via the wave separator 25. The first intermediate frequency energy $fm_1$ which has passed through the aforementioned directional coupler 21 is applied via the wave separator 23 to the amplifier 22 and is amplified and sent out to the terminal-*c*. In a reverse situation where the second high frequency signal $fR_2$ is put into the terminal-*a*, the second high frequency signal $fR_2$ goes through the wave separator 25 and is converted into the second intermediate frequency signal $fm_2$ and amplified by the frequency converting amplifier 26, and is sent out to the terminal-*b* via the wave separator 23 and directional coupler 21.

The second intermediate frequency signal $fm_2$ being put into the terminal-*c* passes through the wave separator 28, is amplified by the amplifier 27 and is sent out to the terminal-*b* via the wave separator 23 and the directional coupler 21.

FIG. 3 shows a modification of the system shown in FIG. 2. It shows a system in which the high frequency signal from the booster 11, carrying the signal being sent from the ground station, is fed to both the left and the right side from the terminal-*a*. The system is not substantially different from that already explained.

Examples of the leaky coaxial cable used in the present invention are ordinary coaxial cables having openings made in the outer conductor as shown in (*a*), (*b*), (*c*), (*d*) and (*e*) of FIG. 4. They are visually self-explanatory, each having an inner conductor with a perforate coaxial outer conductor. Other leaky coaxial cables than those shown in the figure may also be used.

The actual construction of the IF·RF filter is shown in FIG. 5.

FIG. 5 shows the specific construction of the filter shown in FIG. 3(*b*). It is so designed such that only the high frequency wave signal is sent to the terminal-*a*, only the intermediate frequency wave signal to the terminals-*b* and *c*, and the high frequency wave signal and intermediate frequency signal to the terminals-*d* and *e* separated from each other or mixed together.

In FIG. 5, the terminal-*a* is an RF feeder terminal, the terminal-*b* an IF output terminal connected to the aforementined booster. The terminal-*c* is an IF feeder terminal. The terminal-*d* is the front-stage leaky coaxial cable connecting terminal and the terminal-*e* is the rear-stage leaky coaxial cable connecting terminal. Numberal 15 and 16 denote the coaxial inner and outer conductors respectively. The filter consists of elements 19*b* and 20*b*, 19*c* and 20*c*, and 19*d* and 20*d*, 19*e* and 20*e*. Element group 19*d* and 20*d*, and element group 19*e* and 20*e* constitute separate coaxial lines, insulated with the insulation 14. The terminals 17*b* and 17*c* are placed in a short-circuit condition and terminals 17*d* and 17*e* are in an open condition.

The initial end of each filter element group has a gap as indicated at 18*b*, 18*c*, 18*d* and 18*e*. Also, the length of coaxial lines 19*b* 20*b*, 19*c* 20*c*, 19*d* 20*d*, and 19*e* 20*e* is made equal to about one-fourth the wavelength of the RF signal. If so selected, the gaps 18*b* and 18*c* become open to RF signals and short-circuited to IF signals, and gaps 18*d* and 18*e* become short-circuited to RF signal and open to IF signal. In consequence, IF signals coming in from terminal-*d* do not pass to terminals *a*, *c*, *e* because of the gap 18*d* but pass to the terminal-*b*, and IF signals coming in from *c* do not pass to terminals *a*, *b*, *d* because of the gap 18*e*, but pass to *e*.

RF signals coming in from a do not pass to terminals *b* and *c* because of the gaps 18*b* and 18*c*, but it is distributed equally to *d* and *e*.

Figures 1, 2A, 2B, 3A, 3B:
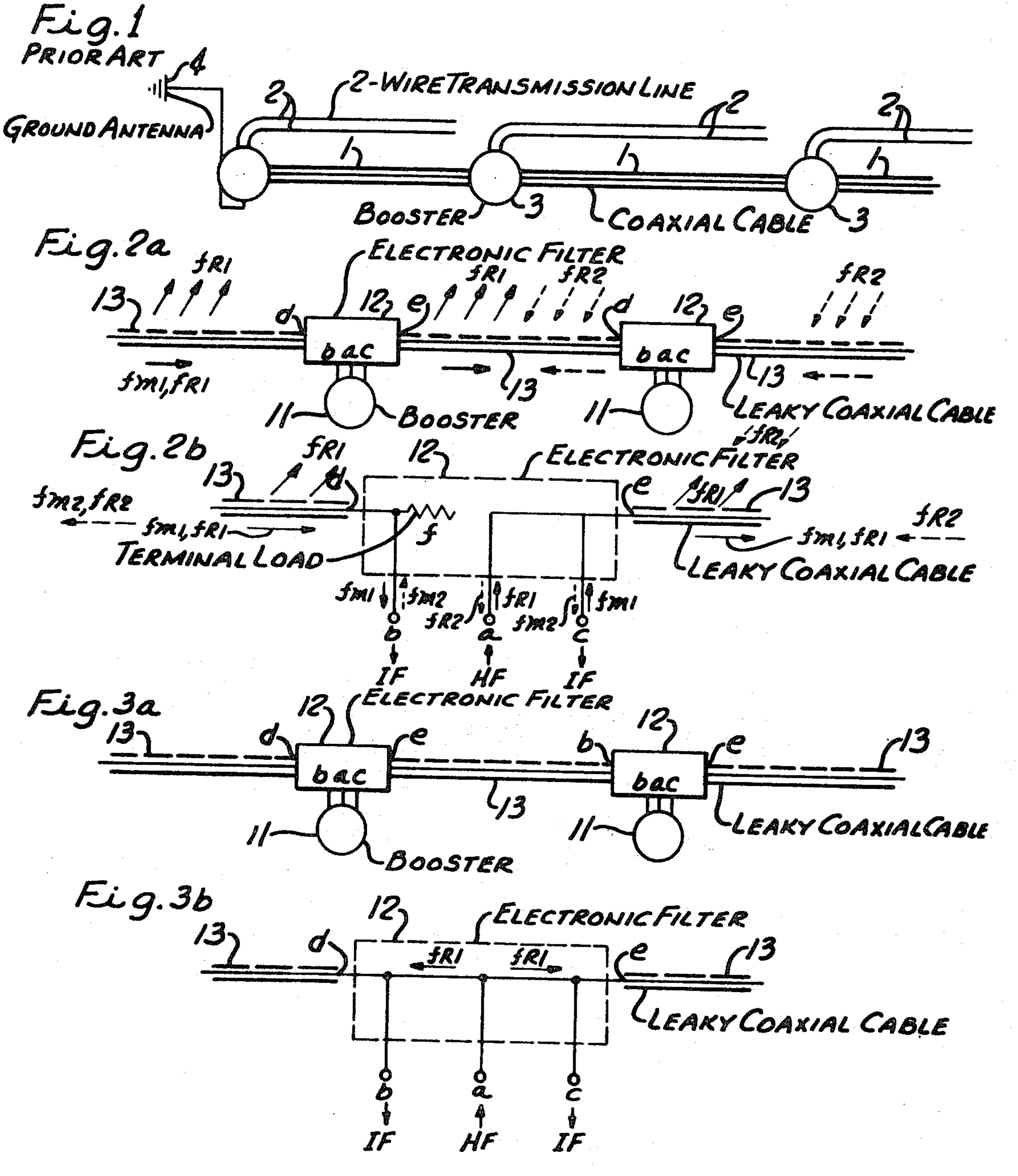
FIG. 1 is a diagrammatic illustration of a transmission system of radio communication for moving vehicles which has heretofore been in use in railroad tunnels.
Figure 4A:
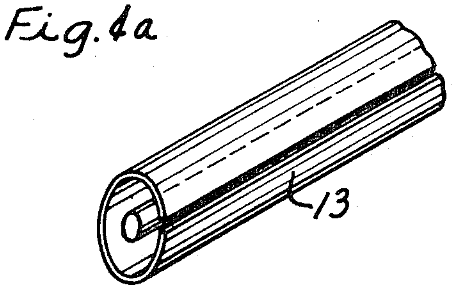
Figure 4B:
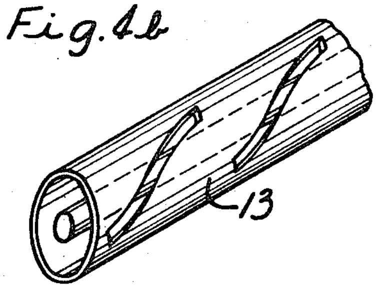
Figure 4C:
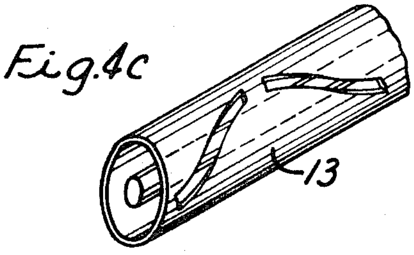
Figure 4D:
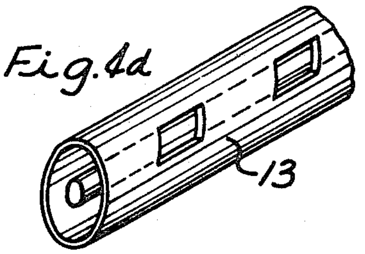

An example of the filter 12 as shown in FIG. 3*b* has been explained. However, the same principle is also applicable to the filters referred to elsewhere in the specification.

The present invention improves the aforementioned system heretofore in use in a number of ways.

First, the output of the booster is increased and the required distance between repeaters is made longer by frequency-conversion repeating wherein the first intermediate frequency signal is converted to the first high frequency signal and the second high frequency signal is converted to the second intermediate frequency signal at the booster.

Secondly, the transmission line is economized by transmitting signals of two different frequency bands (intermediate frequency signal and high frequency signal) by one and the same transmission line.

Furthermore, as a result of the use of a leaky coaxial cable for the transmission line, the high frequency signal radiates at a high efficiency uniformly along the line, while the intermediate frequency signal is transmitted at a low attenuation because its radiation is suppressed and reaches the next booster at a sufficiently high level.

Also, the leaky coaxial cable is used for the transmission line in this system, little interference is encountered due to induction noise from trolley power lines or the like. It also has the feature that leaky coaxial cables of different leakage amounts may be used in combination depending on the distance from the signal dispatch end, so that the coupling degree will be made uniform and the required dynamic range of the ground and train receiver and the boosters will be smaller.

As already stated, the examples of embodiment of the present invention provide a radio communication system for trains. However, this invention is not only practical for utilization for communication inside and outside of tunnels but also can be utilized widely for radio communication with moving bodies in general.

We claim:

1. A radio communication transmission system for moving vehicles following a track comprising a leaky coaxial cable installed in parallel along a track for a moving vehicle, repeaters interposed in said cable at predetermined locations, transmission means connected to said leaky coaxial cable to transmit thereon a signal from a ground station along said leaky coaxial cable at a low loss from repeater to repeater at a first intermediate frequency, amplification means at each repeater responsive to said first intermediate frequency signal to retransmit said first intermediate frequency signal at a low loss further along said leaky coaxial cable, a frequency converter at each repeater responsive to said first intermediate frequency signal to frequency convert a sample of said first intermediate frequency signal into a first radio frequency signal and to transmit said first radio frequency signal further along said leaky coaxial cable at a uniform leakage for coupling with a receiving antenna on a vehicle on the track, a transmitter with a transmission antenna on a vehicle on the track for the transmission of a second radio frequency signal which will couple with said leaky coaxial cable, said converter being operable to frequency convert said second radio frequency signal to a second intermediate frequency signal and to transmit said second intermediate frequency signal at a low loss on said leaky coaxial cable from repeater to repeater for eventual reception by a ground station.

2. The method of transmitting communication signals between a moving vehicle and a ground station comprising the steps of transmitting an intermediate frequency communication signal on a leaky coaxial cable at a low loss, amplifying said intermediate frequency signal and retransmitting said intermediate frequency signal at predetermined locations, frequency converting a sample of said signal intermediate frequency into a radio frequency signal and transmitting said radio frequency signal along with said intermediate frequency signal on the same leaky coaxial cable a said predetermined locations for uniform leakage therealong of said radio frequency signal for coupling to an antenna on a vehicle traveling adjacent to said leaky coaxial cable.

3. The method of claim 2 characterized by the steps of transmitting a second radio frequency signal from a vehicle moving adjacent the leaky coaxial cable to couple the same thereto for transmission thereon, and frequency converting said second radio frequency signal on said leaky coaxial cable to a second intermediate frequency signal for transmission at a low loss on said leaky coaxial cable to a ground station.

* * * * *